UNITED STATES PATENT OFFICE.

THOMAS B. MOHLER AND OONA LUDEKENS, OF ALAMEDA, CALIFORNIA, ASSIGNORS TO THE MOLUDITE CO., OF SAN FRANCISCO, CALIFORNIA, A CORPORATION OF ARIZONA.

WOOD-LIKE ARTICLE OF MANUFACTURE AND PROCESS OF MAKING THE SAME.

1,357,647.          Specification of Letters Patent.     Patented Nov. 2, 1920.

No Drawing.     Application filed September 22, 1919. Serial No. 325,473.

*To all whom it may concern:*

Be it known that we, THOMAS B. MOHLER and OONA LUDEKENS, citizens of the United States, and residents of Alameda, in the county of Alameda and State of California, have invented new and useful Improvements in Wood-Like Articles of Manufacture and Processes of Making the Same, of which the following is a specification.

The present invention relates to an article of manufacture which is to be in the form of boards suitable for building material or furniture, or molded articles generally, out of cellulose, such as straw, paper, and other vegetable matter, preferably waste vegetable matter; and to a process of making the same.

In treating straw, we first reduce it to the condition to which it is reduced in making paper from straw, that is, we mix it with the proper amount of caustic soda and water and then boil the mixture until the fibers are soft. It is then ground as finely as possible and thoroughly washed in cold water to remove the soda and coloring matter, and then dried.

To this is then added the liquid described below (to which we have added iron carbonate precipitate in the proportion of one ounce to five gallons) and mixed until it becomes a plastic, dough-like mass, when it is ready to mold and bake.

In using paper, it is thoroughly boiled in the liquid which is described below until the mass becomes soft and pulpy, after which it is ground as finely as possible when it is ready to mold and bake.

We add to crushed barley sixteen times by weight of boiling water and cook the mass slowly but thoroughly. It is then allowed to cool to a temperature of 100° when a yeast cake is dissolved in warm water and added. This mass is allowed to ferment for at least forty-eight hours, or until fermentation ceases. We then have a mush-like mass mixed with a creamy liquid which is pressed out and used as mentioned above. The residual mass may be used to start fermentation in the next batch of barley.

In baking either of these compounds, the temperature of the oven should be kept as high as it is possible to so maintain it without scorching. The substance is baked until thoroughly dried and is then finished.

It can then be planed or sawed and can be used in the same manner as lumber. It will hold nails or screws equally as well as wood. It can also be polished or painted. As compared with wood, it is much lighter in weight and equally durable.

We claim:

1. An article of manufacture comprising cellulose reduced to a soft condition and a liquid resulting from the fermentation of crushed barley mixed and baked.

2. An article of manufacture comprising cellulose reduced to a soft condition and a liquid resulting from the fermentation of a fermented cereal mixed and baked.

3. The process of making a wood-like article which consists in fermenting barley, separating therefrom the solid residue, boiling cellulose in the residual liquid of the barley, and molding and baking the molded product.

4. The process of making a wood-like article which consists in fermenting barley, separating therefrom the solid residue, boiling cellulose in the residual liquid of the barley, grinding the mass and molding and baking the molded product.

5. As a binder for material in pulverulent form, a liquid resulting from the fermentation of organic matter.

THOMAS B. MOHLER.
            OONA LUDEKENS.